June 17, 1930.  W. H. SIEBS  1,764,991
VALVE
Filed March 5, 1929  2 Sheets-Sheet 1
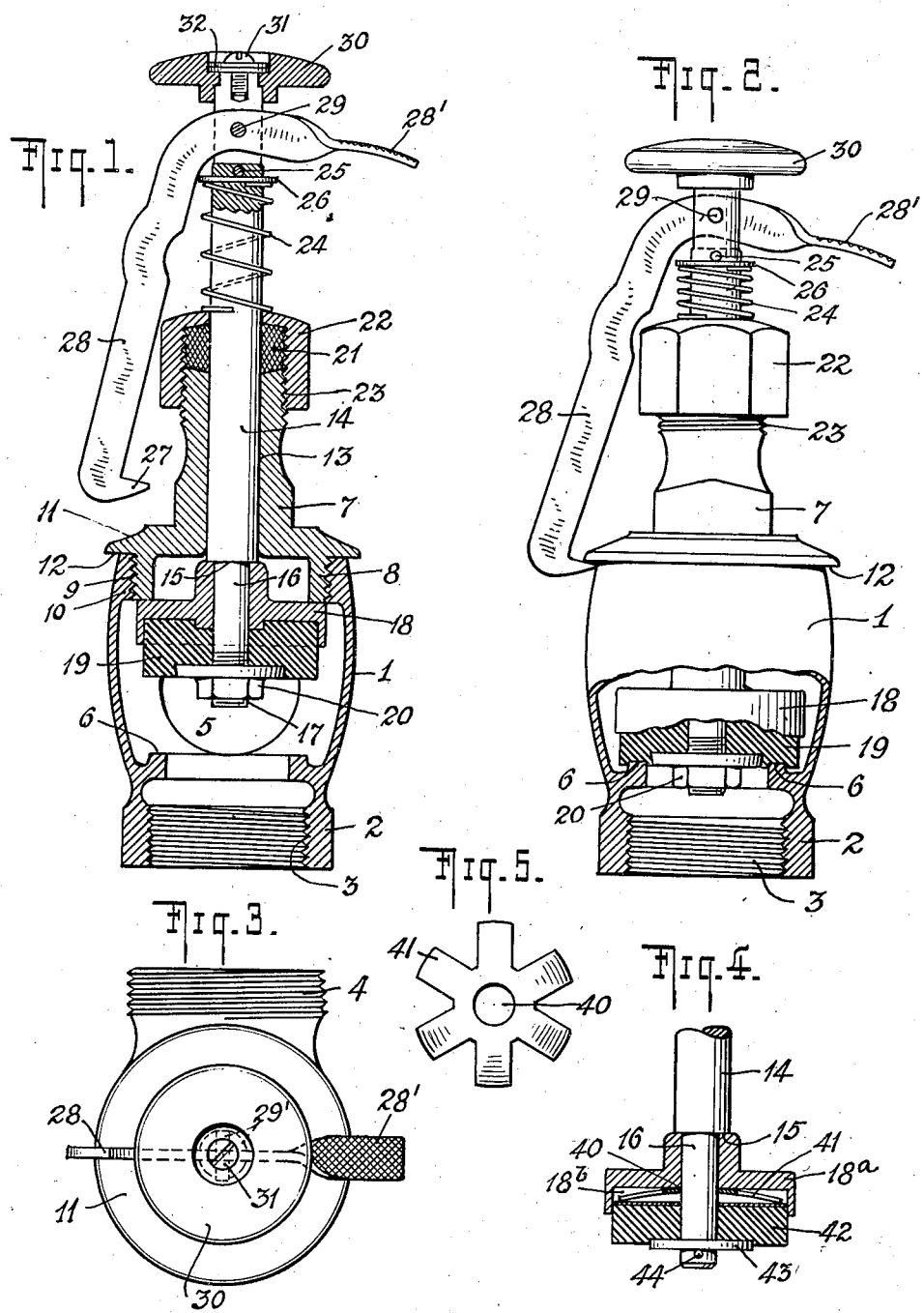
INVENTOR
WILLIAM H. SIEBS
BY
ATTORNEY June 17, 1930. W. H. SIEBS 1,764,991
VALVE
Filed March 5, 1929 2 Sheets-Sheet 2
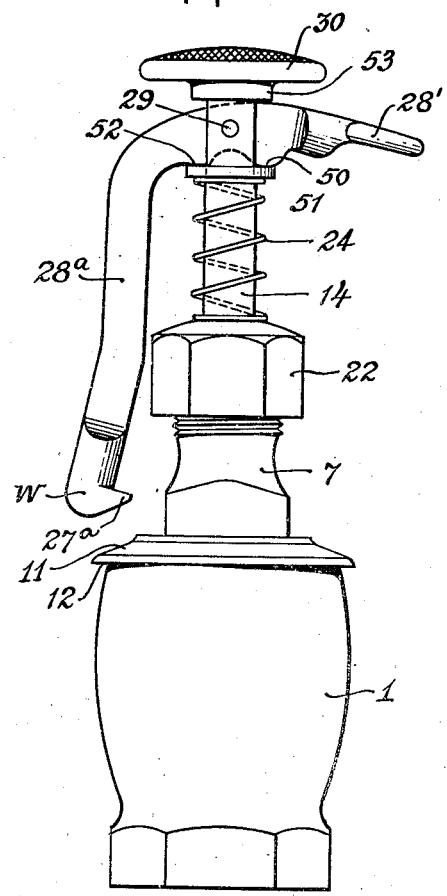
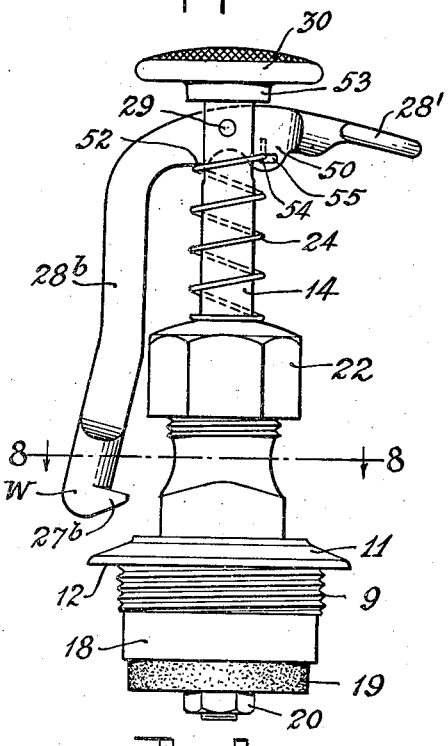
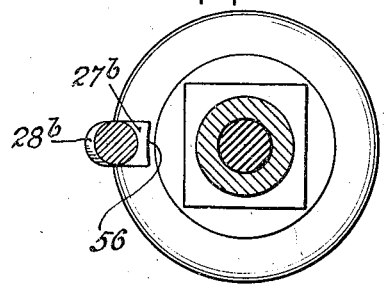
INVENTOR
WILLIAM H. SIEBS
BY
ATTORNEY Patented June 17, 1930

1,764,991

UNITED STATES PATENT OFFICE

WILLIAM H. SIEBS, OF FLORAL PARK, NEW YORK

VALVE

Application filed March 5, 1929. Serial No. 344,297.

This invention relates to valves, and more particularly to quick-acting valves suitable for systems involving the control of fluids, such as steam heating systems having radiators associated therewith.

It is well known that in systems transmitting fluids from one point to another or from one apparatus to another it is necessary to have valve controls at critical places. In the present specification, a household or office heating system will be taken merely for illustrative purposes although it is to be understood that the instance invention is not limited thereto but is appropriate for a wide variety of systems requiring valve-control of fluids. With the household or office heating system there is usually one or more radiators in every room which is heated. Associated with the inlet pipe leading to each radiator is a valve which in a good many instances, is of the globe, angle, or cross type with a threaded stem. On top of the stem, as is well known, a hand wheel or handle is secured so that the radiator can be shut off or opened according to conditions. In order to operate the handle, it is necessary for the person to bend over and to rotate the handle until the valve is closed or is opened. This procedure, as everyone is aware, is a lengthy and tedious operation which is awkward, cumbersome, and annoying. Furthermore, the valve wheels or handles are, in many cases, made of wood which has a tendency to break off and to leave sharp corners which hurt the hand of the person turning the valve. In those cases where the handle is made of metal, the person burns his hand when the valve is hot. Many attempts have been made to overcome the disadvantages of the prior type of valves, described hereinabove, but practically all attempts, as far as I am aware, have been unsatisfactory and have not been successful for one reason or another.

The present invention contemplates providing a valve which is free from the disadvantages noted hereinbefore, which is quick acting and which can be operated by the foot.

A further object of the invention is to provide a valve which is constituted of a relatively few simple parts capable of being manufactured easily and assembled readily and quickly.

Another object of the invention is to provide a valve which is positive and reliable in its action, which is easy to operate and which has practically no parts apt to get out of order.

Other objects and advantages of the present invention will become apparent from the following description taken in conjunction with the accompanying drawing, in which Fig. 1 is a view, partly in section and partly in elevation, of a preferred embodiment of my invention;

Fig. 2 is an elevational view of my improved valve with parts broken away to show the valve in its closed condition;

Fig. 3 is a top plan view of Fig. 2;

Fig. 4 is a fragmentary view of a modified stem and washer for my improved valve;

Fig. 5 is a fragmentary plan view of the spring construction used in my modified stem and washer illustrated in Fig. 4;

Fig. 6 is an elevational view of a modified embodiment of my invention;

Fig. 7 is an elevational view of a part of a valve embodying my invention; and

Fig. 8 is a sectional view taken on the line 8—8 of Fig. 7.

Referring more particularly to Fig. 1, the numeral 1 designates the body of a valve embodying my invention. In the illustration the valve is depicted as an angle valve although it is to be understood that my invention is not limited thereto but is equally applicable to a globe type of valve, a cross valve and many other well known types of valves. The valve body 1 can be made of any suitable material, such as cast iron, steel, brass, bronze, or other metallic material, as one skilled in the art will readily understand. Associated or preferably cast with the bottom 2 of the valve is a screw thread or connection 3 which is intended for the pipe to which the valve is to be connected. At right angles to screw thread 2 and projecting from the body 1 of the valve is a second connection 4, herein shown as a threaded extension which communicates through port 5 to the interior of the valve and which is adapted for connection with a second pipe (not shown). Interposed in the interior of the body between port 5 and screw threads 3 is an annular shoulder 6 which projects vertically in an upward direction and which acts as a valve seat.

A bonnet 7 is fastened to the upper portion of the valve body in any suitable way. In the present structure a threaded projection 8 is provided on the lower side of the bonnet 7 to engage an internal screw thread 9 located at the upper part 10 of the valve body. Projecting transversely from the bonnet and above the upper part 10 of the valve body, is a locking shoulder 11 which is adapted to make contact with the top of the valve body and to provide a hooking edge 12. By screwing the bonnet securely in the top of the valve body, a tight joint is made between the bonnet and the valve.

Within the bonnet a longitudinal channel 13 is incorporated which is provided preferably with a smooth wall adapted to make a good sliding contact. Snugly fitted in and making a sliding contact with channel 13 is a spindle 14 having a smooth contact surface. The cross section of channel 13 and mating spindle 14 may obviously have any desired shape but I have herein shown the cross section as circular as this is about the most convenient shape to make channel 13 and spindle 14. The lower end of spindle 14 is reduced to provide a shoulder 15 and a stud-like member 16 having a thread 17 cut thereon. Fitted on the stud-like member 16 is a disc or washer holder 18 and an associated washer or gasket 19 which are held tightly in position by spindle nut 20. When the spindle with disc holder and washer is in a raised position the top of the disc holder abuts against the bottom of the threaded projection 8.

Secured around the spindle and placed over the top of the bonnet is a ring 21 of stuffing or packing material. This stuffing material is securely held in position by a stuffing box nut 22 which fits on external threads 23 located on the upper part of the bonnet. By this construction, as is well known, a fluid-tight joint is provided which prevents fluids like steam from leaking from the inside of the valve.

The spindle 14, as will be seen from Fig. 1, projects materially above the top of the stuffing box nut 22 to accommodate a locking and quick-release device. This device includes a compression spring 24 which is coiled around spindle 14 and which is held between the top of nut 22 and stop pin 25 and associated washer 26. Spring 24 normally tends to open the valve and to raise washer 19 from its seat 6. When the valve is opened spring 24 is expanded and the spindle is raised to bring disc holder 18 into contact with projection 8, as may be clearly seen in Fig. 1. In this raised position hook 27, which is located at the end of arm 28, hangs freely in the air clear of everything. Arm 28, it will be observed, is pivoted on a pin 29 so that the arm can ride in a slot 29' cut in the top of the spindle as it swings back and forth in operation.

On the head of the spindle a tread or closure plate 30 is fastened by any suitable means such as a screw 31. If it is desired a washer 32 can be positioned under the head of the screw. The closure plate 30 may be constituted of any suitable material which will offer a good grip, particularly to the sole of a person's shoe. For wearing and gripping qualities I prefer to make the closure plate of metal and to knurl the top thereof to provide a non-slip surface. Of course, abrasive surfaces may also be incorporated on the top of the closure plate if a special non-slip surface is desired. When it is desired to close the valve, the tread or closure plate is pressed downwardly with the foot, for instance, until the arm 29 swings outwardly and the hook 27 locks on shoulder 12 as may be clearly seen from Fig. 2. In order to open the valve it is necessary to unlatch hook 27 from locking shoulder 12. This is accomplished by pressing on an extension of the pivoted arm 28 which is developed as a treadle 28'. I prefer to knurl the treadle so as to provide a surface having a good grip.

A modified washer construction is shown in Figs. 4 and 5 wherein a solid rigid washer is employed. Spindle 14 has the same construction as that illustrated in Figs. 1 and 2. On member 16 of spindle 14 a modified gasket holder 18$^a$ fits and abuts against shoulder 15 thereof. Within a recess 18$^b$ in the gasket holder a spider-like spring 40 which is mounted on member 16 is seated. The spider arms 41 are curved downwardly and bear against a washer 19$^a$ which is made of material suitable to resist the action of hot steam particularly at substantial pressures, as one skilled in the art will readily understand. The washer 19$^a$ is held in place by any appropriate means such as a washer 43 held in position by a cotter's pin 44. With this construction, it will be observed that the washer is subjected to a substantially uniform pressure throughout its entire periphery of the washer. By utilizing this modified washer construction, closing of the valve is facilitated especially when pressures higher than the customary low pressures are encountered. This becomes apparent when it is realized that the spider-like spring 40 acts as an agent capable of taking up compression in the spindle system when the valve is being closed. During closing of the valve, the bottom of hard washer 42 makes peripheral contact with the seat 6 in the valve body as the spindle nears the end of its downward travel or stroke. Since the washer 42 is of a hard and rigid nature it does not give or yield when it is pressed against seat 6. The spring 40, however, yields and permits proper and tight seating of the valve and latching of locking arm 28 on the hooking or locking shoulder 11. It is clear, therefore, the incorporation of the aforesaid washer construction in my new valve improves the construction and provides a structural organization which is easy to manufacture and to fabricate, which is not apt to get out of order, which is capable of closing easily, securely and tightly.

In Fig. 6 a modified locking and releasing device is illustrated in conjunction with my improved valve. As the general construction of the valve depicted in Fig. 6 is the same, with the exception of the locking and releasing device, as the valve described hereinabove, it will not be necesary to repeat the description of various detail features. The body of the valve is designated by the numeral 1, the bonnet by the numeral 7 and the stuffing box nut by the numeral 22. The locking and releasing device is mounted, as noted heretofore, on a pivot in a slot at the top of the spindle 14 and is made of drop forged metal or cast metal or even stamped sheet metal like the device shown in Figs. 1 and 2. Locking arm 28ª normally hangs contiguous to the stuffing box nut 22 when the valve is in an open condition. In order to hold the locking arm inwardly in a positive manner I provide a shoulder 50 on the underside of the releasing treadle 28′ which is acted upon by compression spring 24 via plate 51. When the valve is open and the spindle is in a raised position plate 51 in addition to bearing against shoulder 50 bears against shoulder 52 projecting from the underside of arm 28ª near pivot 29. During the closure of the valve locking hook 27ª rides on the upper face of locking shoulder 11 and lifts shoulder 52 upwardly from plate 51 so as to permit the force of the compression spring 24 to be effective in holding locking hook 27ª in close engagement with the locking shoulder 11. This arrangement tends to bring about reliable and effective coaction between the locking arm and the locking shoulder so that the locking hook 27ª is caused to make a safe and secure latching connection in a quick manner as one skilled in the art will readily understand. It will be observed that the compression spring performs the joint function of forcing the locking arm upwardly via the spindle and of forcing the locking arm inwardly via shoulder 50 against and under the hooking edge 12 to establish a firm latching of the valve in a closed position. This feature is particularly advantageous in situations where the valve has a horizontal position or even an inverted position instead of a vertical position where gravity can act on the free end of the locking arm to hold it in proper position for latching, i. e. inwardly against the locking shoulder.

The operation of the valve depicted in Fig. 6 is obvious and is similar to the operation of the valve shown in Figs. 1 and 2 and described hereinabove. In other words, when it is desired to close the valve the closure plate 30 can be pressed downwardly with the foot or the like until hook 27ª rides along the top face of locking shoulder 11 and then snaps under the hooking edge 12 due to the positive pressure of the spring acting through shoulder 50. After locking hook 27ª has snapped under hooking edge 12, it is held positively in this position by the expansive force of spring 24. When it is desired to open the valve, treadle 28′ is pressed downwardly with the foot or the like to throw locking arm 28ª outwardly so as to free locking hook 27ª from hooking edge 12 and, thus, permit spring 24 to raise the spindle upwardly to effect unseating of the washer and opening of the valve. In order to prevent any possibility of treadle 28′ from being pressed too far I provide an annular ride 53 or the like on the bottom of closure plate 30. By the use of the aforesaid arrangement it is not necessary to rely on gravity to hold locking arm 28ª in its proper position and to assist in the latching of the hook 27ª, because the arm is held in position in a positive manner by the action of the helical spring 24.

In Fig. 7 I have illustrated another modified quick locking and releasing device, somewhat similar to the one depicted on Fig. 6, in conjunction with a valve structure which is capable of fitting or screwing into the body of a valve, particularly a standard type of angle, globe, or cross valve. The valve structure comprises a bonnet 7, a spindle 14 incorporated within said bonnet and a quick locking and releasing device associated with said spindle. A fluid-tight seal is maintained between spindle 14 and the bonnet by a stuffing box which is covered by stuffing box nut 22. The end of the spindle is provided as usual with a gasket or washer holder 18 and a washer 19 made of rubber or other material suitable for resisting the fluid and pressure within the valve as one skilled in the art will readily understand. I prefer to provide a connection, at the base of the bonnet below locking shoulder 11 of such a character like standard threads 9, that will mate with any of the standard connections incorporated in standard valves.

The quick locking and releasing device which is shown in Fig. 7 has the usual type of locking arm 28ᵇ, preferably weighted at that portion thereof designated by the letter W. At the free end of the locking arm a locking hook 27ᵇ is provided. This hook is adapted to ride over the face of the locking shoulder 11 and to engage and to make a reliable and secure connection with hooking edge 12 of the locking shoulder. The locking shoulder, of course, is always made of such size and shape that no matter what type of standard valve the aforesaid structure is used with, a free, unobstructed and projecting hooking edge 12 will be provided.

The locking arm is mounted in the same manner as described hereinabove, i. e., pivoted in a slot cut in the top of the spindle on a pivot 29. Extending to the right of the pivot is treadle 28' which has shoulder 50 associated with the underside thereof. The upper terminal end portion 54 of helical spring 24 is anchored by projecting through a hole or slot 55 in the shoulder 50. The part of the spring just anterior to portion 54 rides against shoulder 52. By this construction the locking arm is positively held in its proper place within the confines of the valve. When the spindle is depressed by means of closure plate 30 and when locking hook 27b rides along the face of locking shoulder 11 during the closing of the valve, the expansive force of the spring operating via shoulder 50 is particularly effective to hold the locking arm inwardly in a positive manner, and, thus to insure a quick and reliable latching connection between hook 27b and hooking edge 12. The spring 24 thus serves a dual function of lifting the locking arm upwardly and also of forcing hook 27b inwardly when the valve is in a closed condition. With this arrangement, therefore, an effective latching action will be insured at all times no matter whether the valve has a vertical position, a horizontal position, an inverted position or various angular positions.

From Fig. 8 it will be observed that hook 27b has a wide jaw 56 which has a concave contour preferably conforming or mating with that of the periphery of locking shoulder 11. By providing a wide jaw a good and effective grip can be attained in the latching operations. Of course, when it is desired to open the valve, the treadle 28' is depressed so as to throw the hook 27b out of connection with hooking edge 12, and, thus, permit raising of the spindle under the influence of the spring and the opening of the valve.

The valve structure illustrated in Fig. 7 can be manufactured and sold by itself as an article of commerce so that users can replace the old structure in their radiator valves or the like with my new quick locking and releasing type. This will enable users to equip their present systems with my new valve structure without having to take the valve bodies out of the system. All that is required for the installation of my new valve structure is to unscrew the bonnet with the associated parts and then to screw my new valve structure in its place.

Although I have illustrated and described my improved quick locking and releasing valve in conjunction with steam heating systems, it is obvious that my valve is also applicable to other systems, such as water systems, fire sprinkling systems and the like.

It is also to be observed that although I have described a specific embodiment of my invention, the invention is not restricted to such particular embodiment. Various modifications in detail and in the arrangement of the parts may be made by those skilled in the art without departing from the invention as defined in the claims.

I claim:

1. A valve comprising a body of cast metal having an internal raised shoulder forming a seat for a washer, an inlet and outlet communicating with said body, a metallic bonnet fitting in said body, a locking shoulder associated with the said bonnet, a spindle extending through said bonnet and making a sliding contact therewith, a washer holder mounted at the lower end of said spindle, a washer secured in said holder and adapted to make a fluid-tight contact with the said seat, a locking and releasing device pivotally mounted at the upper part of said spindle, a hook associated with the said device and adapted to engage the said locking shoulder when the spindle is in a lowered position and to hang over the bonnet when the spindle is in a raised position, and means for normally holding the spindle in a raised position whereby the valve is normally held opened and whereby the spindle must be depressed in order to secure the hook on the locking shoulder and close the valve.

2. A valve comprising a metal body, a seat incorporated within said body, an inlet and an outlet communicating with the interior of said body, a metal bonnet secured to the top of said body in alignment with said seat, a smooth faced spindle slidably mounted within said bonnet, sealing means located at the top of said bonnet and positioned around said spindle to form a fluid-tight joint between the said bonnet and the said spindle, a rigid washer holder mounted on the lower end of said spindle, a washer secured to said holder and adapted to make a fluid-tight joint with said seat, a spring associated with said spindle for normally holding the latter in a raised position and the valve open, a locking arm pivotally mounted on the upper part of said spindle and adapted to lock the spindle in a lowered position with the washer making contact with said seat to close the valve, and a releasing arm associated with said locking arm whereby the said locking arm can be released and the valve opened.

3. A valve comprising a body having a seat and provided with an inlet and an outlet, an opening in the top of the body in alignment with said seat, a bonnet fitting in said opening, a smooth cylindrical spindle slidably mounted in the said bonnet, a stud-like member projecting from the lower end of said spindle, a washer holder fitting on said stud-like member, a washer mounted on said stud-like member underneath the said holder and adapted to make a fluid-tight joint with the said seat when the spindle is in a lowered position, a stuffing box located at the junction between the top of said bonnet and the spindle, a locking arm pivoted at the upper part of said spindle and adapted to lock the spindle in its lowered position and normally hanging so that the lower end thereof is positioned over the bonnet, a helical spring wound around a portion of the spindle which projects above the top of the suffing box and having its upper end secured in close association with the upper part of the said spindle whereby the spindle is normally held in a raised position with the washer out of contact with its seat and the valve open, and a releasing arm operatively connected to said locking arm where the latter can be released so as to permit the spring to raise the spindle and thus unseat the washer and open the valve when the valve is in its closed position.

4. A quick releasing and locking valve comprising a body of metal having an internal raised shoulder forming a seat for a washer, an inlet and outlet communicating with said body, a metallic bonnet fitting in said body, a locking shoulder associated with the said bonnet, a spindle extending through said bonnet and making a sliding contact therewith, a washer holder mounted at the lower end of said spindle, a washer secured in said holder and adapted to make a fluid-tight contact with the said seat, a locking and releasing device pivotally mounted at the upper part of said spindle, a hook associated with the said device and adapted to engage the said locking shoulder when the spindle is in a lowered position and to hang over the bonnet when the spindle is in a raised position, means for normally holding the spindle in a raised position whereby the valve is normally held opened and whereby the spindle must be depressed in order to secure the hook on the locking shoulder and close the valve, said means adapted to positively apply to said hook an inward and upward force to effect a reliable connection between said hook and locking shoulder when the spindle is in a lowered position.

5. A quick releasing and locking valve comprising a metal body, a seat incorporated within said body, an inlet and an outlet communicating with the interior of said body, a metal bonnet secured to the top of said body in alignment with said seat, a smooth faced spindle slidably mounted within said bonnet, sealing means located at the top of said bonnet and positioned around said spindle to form a fluid-tight joint between the said bonnet and the said spindle, a rigid washer holder mounted on the lower end of said spindle, a washer secured to said holder and adapted to make a fluid-tight joint with said seat, a spring associated with said spindle for normally holding the latter in a raised position and the valve open, a locking arm pivotally mounted on the upper part of said spindle and adapted to lock the spindle in a lowered position with the washer making contact with said seat to close the valve, a releasing arm associated with said locking arm whereby the said locking arm can be released and the valve opened, and a shoulder positioned on the underside of the locking arm to be operated upon by the expansive force of said spring so as to cause the locking arm to be forced inwardly and thus to insure a quick latching of the spindle in a lowered position.

6. A quick releasing and locking valve comprising a body having a seat and provided with an inlet and an outlet, an opening in the top of the body in alignment with said seat, a bonnet fitting in said opening, a smooth cylindrical spindle slidably mounted in the said bonnet, a stud-like member projecting from the lower end of said spindle, a washer holder fitting on said stud-like member, a washer mounted on said stud-like member underneath the said holder and adapted to make a fluid-tight joint with the said seat when the spindle is in a lowered position, a stuffing box located at the junction between the top of said bonnet and the spindle, a locking arm pivoted at the upper part of said spindle and normally hanging so that the lower end thereof is positioned over the bonnet, a helical spring wound around a portion of the spindle which projects above the top of the stuffing box and having its upper end secured in close association with the upper part of the said spindle whereby the spindle is normally held in a raised position with the washer out of contact with its seat and the valve open, a releasing arm operatively connected to said locking arm whereby the latter can be released so as to permit the spring to raise the spindle and thus unseat the washer and open the valve, a shoulder associated with the underside of said releasing arm, and an anchoring means incorporated in said shoulder for holding the upper terminal end portion of said helical spring so that the expansive force of the spring is effective upon the releasing arm to cause the lower end of the locking arm to be forced inwardly.

In testimony whereof I have hereunto set my hand.

WILLIAM H. SIEBS.